US006485079B1

(12) United States Patent

Brown et al.

(10) Patent No.: US 6,485,079 B1

(45) Date of Patent: Nov. 26, 2002

(54) TAILGATE FOR MULTIPLE COMPARTMENT MATERIAL CONTAINER

(75) Inventors: Michael J. Brown, Northfield, MN (US); Clifford A. Brekke, Claremont, MN (US); John G. Pecka, Rochester, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 09/940,785

(22) Filed: Aug. 28, 2001

(51) Int. Cl.[7] ................................................ B60P 1/267

(52) U.S. Cl. .......................... 296/50; 296/56; 296/24.1

(58) Field of Search ........................... 296/50, 56, 101, 296/24.1; 414/512, 408, 525.6, 525.55; 220/1.5

(56) References Cited

U.S. PATENT DOCUMENTS

| | | | | | |
|---|---|---|---|---|---|
| 2,212,058 | A | * | 8/1940 | Wood | 296/56 |
| 3,865,260 | A | * | 2/1975 | Wieschel et al. | 414/512 |
| 3,873,149 | A | * | 3/1975 | Churchman | 296/56 |
| 4,067,466 | A | * | 1/1978 | Parks et al. | 296/50 |
| 4,141,582 | A | * | 2/1979 | Streeter | 296/50 |
| 4,227,849 | A | * | 10/1980 | Worthington | 414/408 |
| 4,230,359 | A | * | 10/1980 | Smith | 296/101 |
| 4,538,951 | A | * | 9/1985 | Yeazel et al. | 296/56 |
| 4,666,211 | A | * | 5/1987 | Smith et al. | 296/24.1 |
| 4,948,323 | A | * | 8/1990 | Gasparini | 414/525.6 |
| 5,078,567 | A | * | 1/1992 | Lombardo | 296/24.1 |
| 5,122,025 | A | * | 6/1992 | Glomski | 220/1.5 |
| 5,288,196 | A | * | 2/1994 | Horning et al. | 414/512 |
| 5,316,430 | A | * | 5/1994 | Horning et al. | 414/525.55 |
| 5,335,958 | A | * | 8/1994 | Christenson et al. | 296/56 |
| 5,484,246 | A | * | 1/1996 | Horning et al. | 414/512 |
| 5,527,098 | A | * | 6/1996 | McKinney et al. | 296/56 |
| 5,584,642 | A | * | 12/1996 | Huntoon | 414/525.2 |
| 5,681,140 | A | * | 10/1997 | Christenson | 414/525.6 |
| 5,772,384 | A | * | 6/1998 | Richards | 414/525.2 |
| 5,797,715 | A | | 8/1998 | Christenson | |
| 5,868,543 | A | | 2/1999 | McNeilus et al. | |
| 6,027,300 | A | * | 2/2000 | Richards | 414/525.2 |

* cited by examiner

*Primary Examiner*—Kiran Patel

(74) *Attorney, Agent, or Firm*—C. G. Mersereau; Nikolai & Mersereau, P.A.

(57) ABSTRACT

A tailgate system is disclosed that relates generally to vehicles for collecting, transporting and unloading several sorted classes of materials, that may include recyclable materials, in which the truck body is in the form of a generally hollow container mounted on a truck chassis and having an internal volume partitioned into two or more horizontally extending compartments, each equipped to receive, store and discharge or eject materials. The tailgate system is a split system that enables totally separate operation of a tailgate door for each compartment, but which includes automatic latching and maintains a relatively low center of gravity with reference to the vehicle regardless of the position of the doors.

14 Claims, 5 Drawing Sheets

TAILGATE FOR MULTIPLE COMPARTMENT MATERIAL CONTAINER

BACKGROUND OF THE INVENTION

I. Field of the Invention

The present invention relates generally to vehicles for collecting, transporting and unloading several sorted classes of materials, that may include recyclable materials, in which the truck body is in the form of a generally hollow container mounted on a truck chassis and having an internal volume split or compartmentalized into two or more compartments, each equipped to receive, store and discharge or eject materials separately. More particularly, the present invention relates to a split tailgate system that enables the separate operation of a tailgate door for each compartment, but which maintains a reduced center of gravity with reference to the vehicle regardless of the position of the doors.

II. Related Art

The art of refuse collection is becoming increasingly complex, particularly in view of the rising interest in requirements with respect to recyclable goods. Rules and requirements of recycling restrict comingling of unlike materials such as paper with glass, metal and plastic goods. These separately loaded and stored materials must also be kept apart during the discharge operation so that each associated compartment must be capable of being unloaded to the exclusion of others.

Vehicles of the class have been specifically designed with refuse bodies arranged in several compartments for the separate processing of segregated materials. This includes the use of a split compartment charging hopper for separately charging upper and lower storage compartments. The refuse body may employ a single set of packing cylinders in conjunction with connecting arms between upper and lower packers to operate both packers or use individual dedicated compacting mechanisms. Provision is made for separate discharge from the upper and lower compartments. Examples of these are shown and described in U.S. Pat. No, 5,868,543 which illustrates a packing apparatus with a multi-compartment storage body which includes a charging hopper divided into upper and lower portions, each having its own packing system. Front loading systems of the class are shown in U.S. Pat. Nos. 5,681,140 and 5,797,715; all of which are assigned to the same assignee as the present application.

A further tailgate design for a multiple compartment rear discharge collection vehicle is shown in U.S. Pat. No. 5,527,098 which allows access to each of two (upper and lower) compartments in a rear discharging refuse body using a plurality of doors which allows separate operation. However, both doors are hinged at the top of the refuse body. The opening of the doors at once owing to the top hinging of both doors may, in certain instances, raise the center of gravity of the system sufficiently to adversely affect the stability of the vehicle. This is particularly true in the case of a dump body unloading system in which the front of the container is raised during the discharge operation and/or wherever heavy material is loaded into the upper compartment.

It will readily be seen that a definite need remains for a rear discharging, multiple compartment refuse vehicle of the class that enables clear separate discharge of stacked compartments with a minimal effect on the center of gravity of a discharging vehicle.

SUMMARY OF THE INVENTION

The present invention provides a tailgate system for a split body collection vehicle which allows the separate discharge of upper and lower longitudinally oriented compartments in the storage container by the provision of upper and lower discharge doors featuring a vertically pivoting lower door which operates using a mid-body hinging system and is shorter than the height of the lower compartment and thereby introduces a vertical unsealed gap between the doors. An auxiliary closure device is provided to normally close the upper portion of the lower compartment maintained by the upper portion of the lower door. This unique construction provides adequate clearance that enables the lower door to open fully while the upper discharge door remains closed. Conversely, the system also enables the upper door to open alone fully or both to open at once, if desired, each mutually clearing the other without sacrificing the ability to fully expose the related compartment to allow full ejection or requiring top hinging of the lower door.

In the detailed embodiment, each of the doors is operated by a pair of oppositely disposed fluid cylinders with associated rods which, upon extension, lift and pivot the doors in a manner that accomplishes both unlatching and opening using vertically adjustable hinge pins that are designed to travel as followers along slots provided. The auxiliary closure device is an intermediate vertically pivoting plate member suspended at the top of the lower compartment and, as stated, the lower portion of the plate is normally held closed by the upper portion of the lower door when the door is in the closed position, but is allowed to freely pivot with the lower door to expose the full discharge opening of the lower compartment when the lower door is open and thereby to enable sufficient separation such that full open/close independence is achieved by the stacked doors of the tailgate system.

While the detailed description pertains to a particular embodiment of the invention, it will be appreciated that that embodiment is offered by way of example rather than limitation with respect to the underlying invention and those skilled in the art will appreciate that other embodiments could be used as well.

BRIEF DESCRIPTION OF THE DRAWINGS

In the drawings, wherein like numerals are utilized to designate like parts throughout the same.

DETAILED DESCRIPTION

The multi-compartmented collection vehicle body tailgate system designed of the present invention is generally applicable to front and side loading rear discharging collection vehicles and is characterized by the ability to operate the tailgates independently while maximizing the retention of a low center of gravity during the discharge operation. Refuse vehicles of the class are generally characterized by a continuous, permanent horizontal divider separating an upper compartment from a lower compartment. The systems are characterized by charging hoppers having separate compartments each connected with an associated one of the upper or lower storage compartments and separate fluid-operated rams or compactor panels dedicated to compaction or loading of materials into each of the compartments materials and packing against a closed tailgate door where appropriate.

Figure 1:
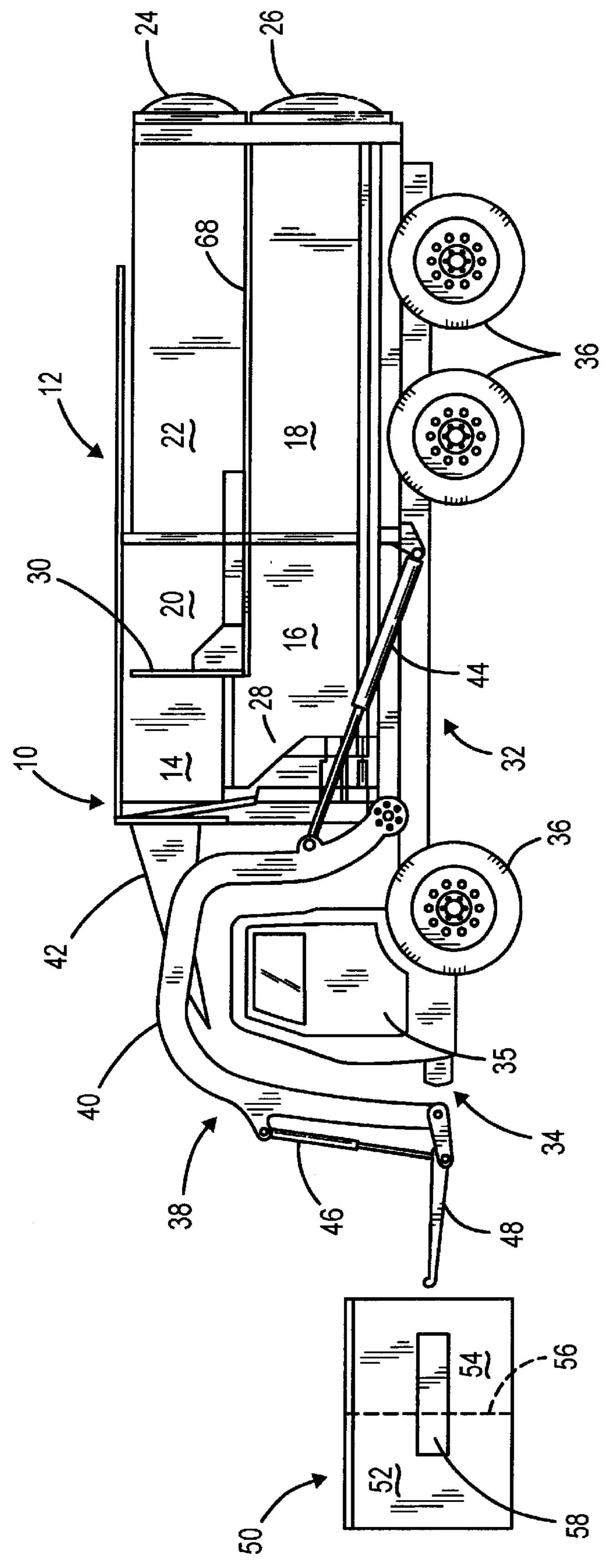
FIG. 1 (PRIOR ART)
FIG. 1 illustrates a prior art dual-compartment front loading refuse vehicle of one type suitable for use with the dual tailgate system of the invention.

In the drawings, FIG. 1 depicts the side view of a front loading refuse vehicle suitable for use with the tailgate system of the invention. The vehicle is shown generally at 10 with the sides removed to reveal some of the interior details. The refuse hauling body includes a refuse receiving area which is a chamber generally divided into a forward section 14 which connects with a lower loading hopper 16 which feeds a lower storage body compartment 18. An upper loading hopper 20 has a receiving opening rearward of the lower loading hopper 16 and is connected to an upper storage body compartment 22. Lower storage body compartment 18 and upper storage body compartment 22 are provided, respectively, with upper and lower arcuate tailgates 24 and 26. These tailgates are designed to absorb the forces of compaction and maintain a pressurized load as necessary when closed. They swing open to allow discharge of the refuse in the corresponding storage body compartment. Each of the loading hoppers is provided with a packing ram mechanism, including a lower panel, generally at 28 and an upper panel generally at 30. The body 12 is attached to a frame or chassis 32 which also carries a cab section 34 with door 35 and wheels at 36. A lift and dump mechanism, shown generally at 38, is provided to empty refuse containers into the receiving hoppers 14 and 18.

The lift and dump mechanism contains identical devices addressing either side of the vehicle, one side being depicted in FIG. 1, including a heavy lift arm 40 which operates outside cab protector 42, lift and dump hydraulic cylinders 44 and 46 and lifting fork 48. The truck is shown about to address a refuse/recycle box 50 separated into a forward compartment 52 and a rear compartment 54 by a vertical wall 56. One of two lift handles designed to be addressed by the forks 48 is shown at 58.

Figure 2:
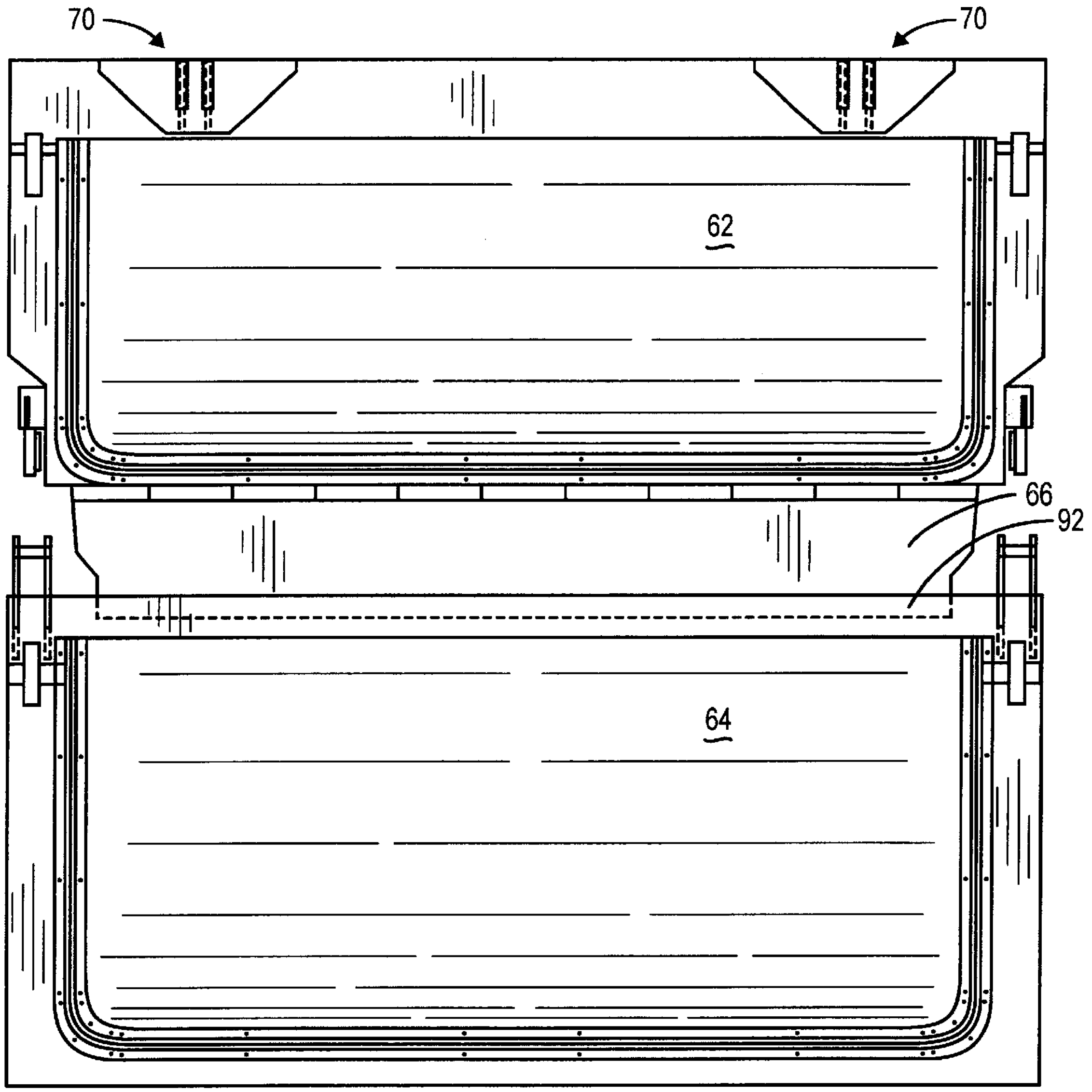
FIG. 2 is an elevational view of the rear of a dual-compartment refuse container body utilizing the dual tailgate system of the invention with the doors closed.
Figure 3:
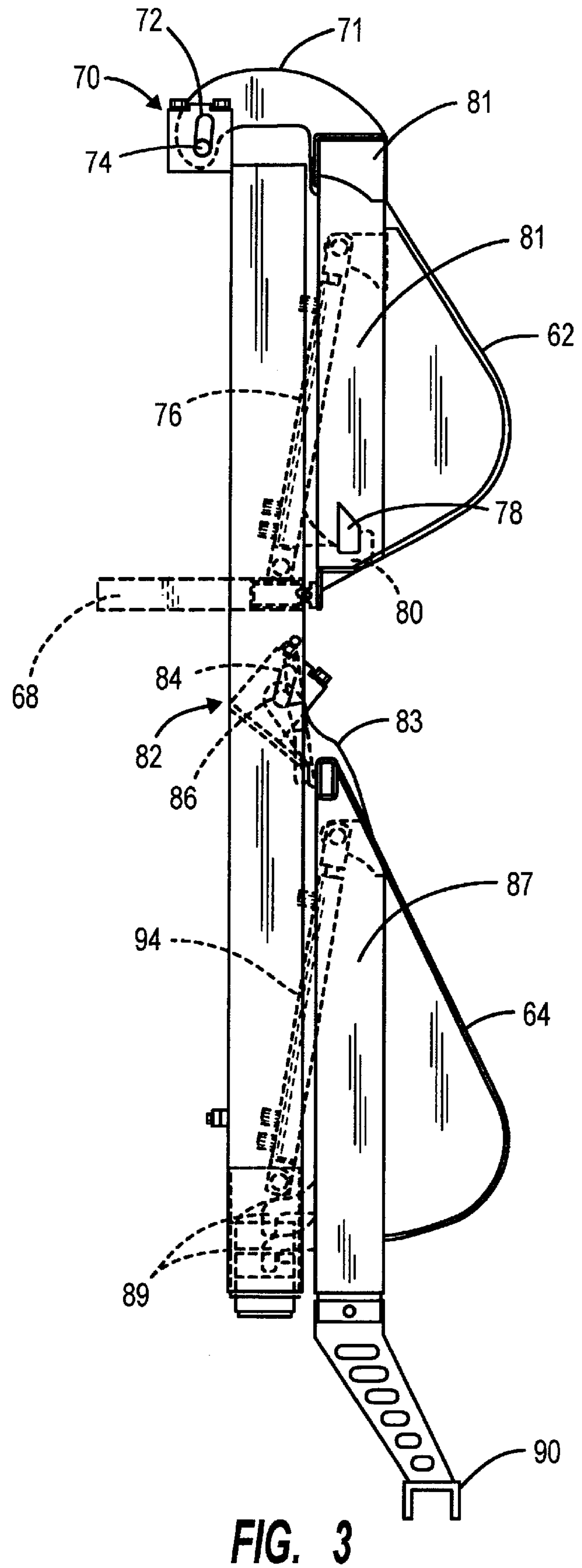
FIG. 3 is a fragmentary side view of the end of the container of FIG. 2 showing both tailgates in the closed, latched position.

A representative embodiment of the tailgate system of the invention which is suitable as a retro fit to a multi-compartment rear discharging collection body or to be incorporated in the construction of new bodies is depicted in FIGS. 2–5. FIG. 2 depicts a rear view of a truck body or container, generally at 60, with both an upper door 62 and a lower door 64 in a closed position. An intermediate hinged auxiliary closure panel device between the doors 62, 64 is shown at 66 and is used for closing the upper portion of the lower compartment as is better seen in FIGS. 3 and 4 which depict an intermediate generally horizontal divider wall 68 which separates the storage volume into upper and lower storage compartments in the manner illustrated in FIG. 1.

Figure 4:
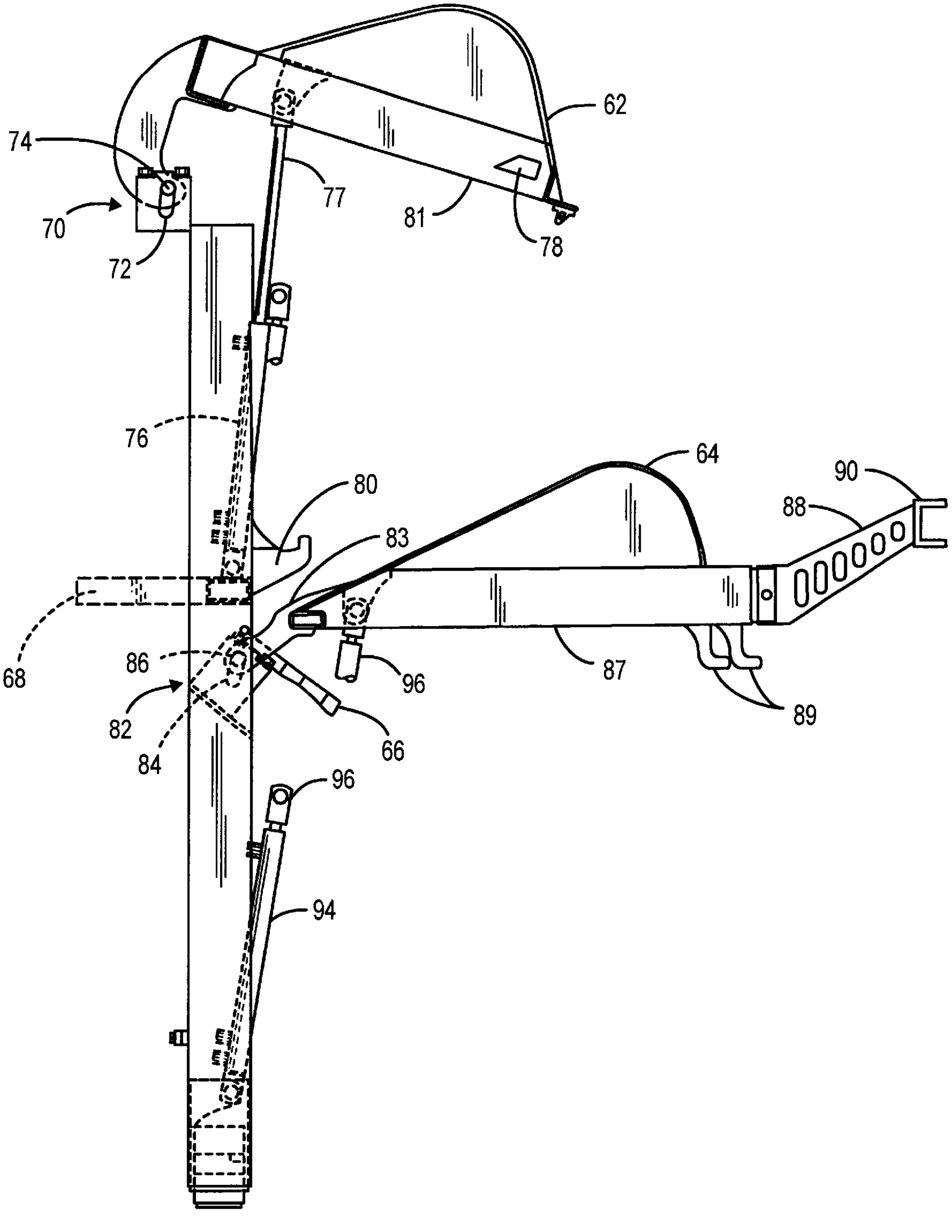
FIG. 4 is a view similar to FIG. 3 with both tailgates open.
Figure 5:
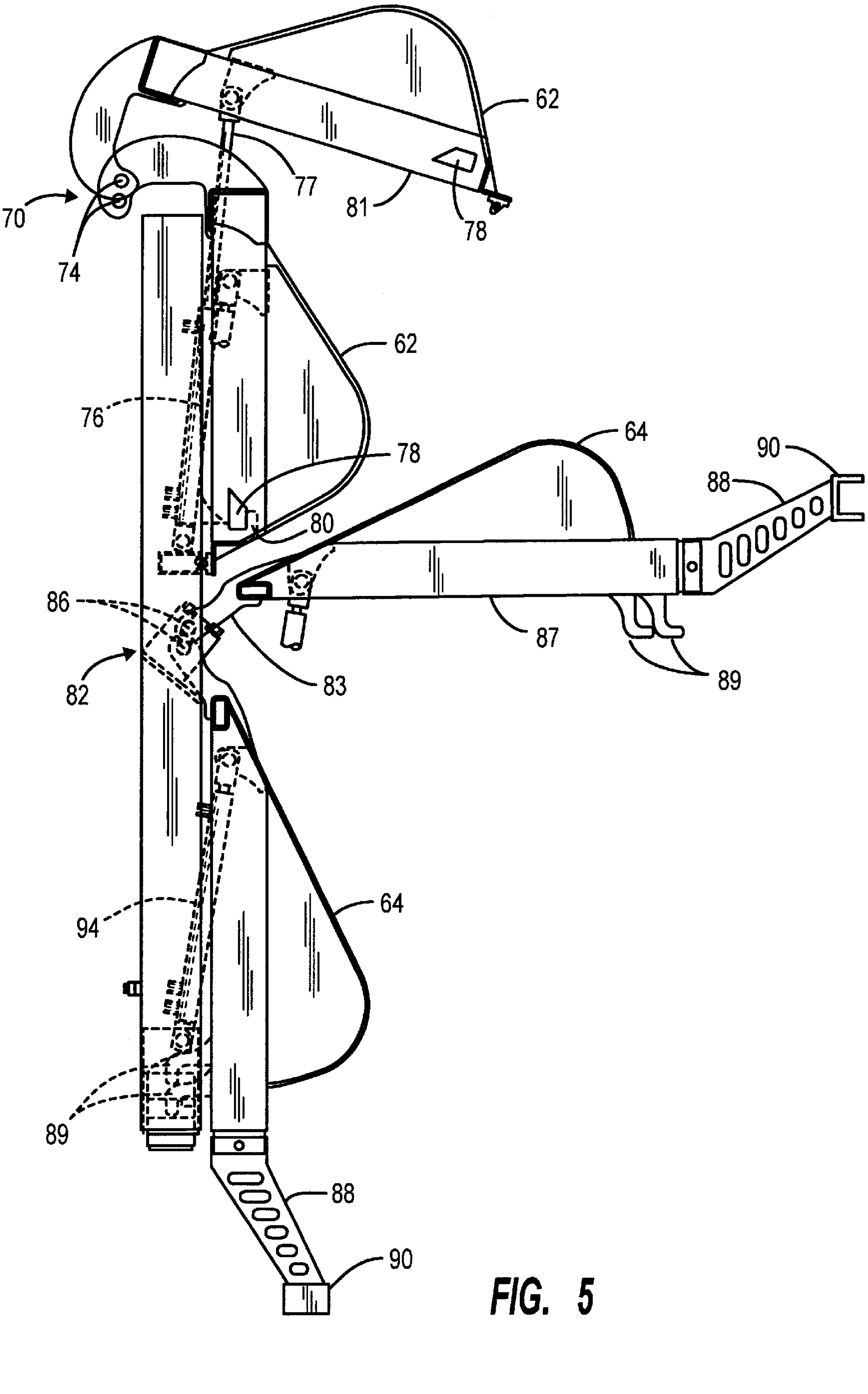
FIG. 5 is a side view showing the tailgates in both positions to depict the clearance achieved by the system.

The upper door 62 is designed to completely close the discharge opening of the upper compartment and is hinged to lift and pivot vertically using a pair of spaced opposed hinge systems 70, each of which includes an arcuate shape extension member 71 hinged in a vertical slot 72 using associated follower hinge pin 74. The door is operated by a pair of oppositely disposed fluid cylinders as at 76 with rods as at 77 which are designed to lift the door and swing it out as shown in FIGS. 4 and 5. The door is provided with a latch including a pair of vertical latch members as at 78 which nest in corresponding upward directed hook members as at 80 as the closed door is lowered so that latching and unlatching is automatically achieved by vertical displacement of the door prior to opening or after the door swings shut, utilizing the cylinders 76. Door 62 is shown in the raised but yet unopened position in FIG. 3 with the pin 74 at the top of slot 72, fully opened in FIG. 4 and in both the closed, latched and fully opened positions in the clearance illustration of FIG. 5. The door is stiffened as by a frame of structural members one of which is shown at 81.

The lower door 64 is spaced beneath the upper door 62 and is of similar construction in many respects. The door 64 features a pair of vertically displaceable hinge systems 82 which are of a construction somewhat similar to that of the hinge system 70 utilized for the upper door 62. The hinge systems 82, thus, include shaped extension members 83, slots 84 and pin followers 86 which enable the hinges (and the door 64) to be displaced vertically prior to swinging open in the manner of the door 62 in order to accomplish automatic latching and unlatching. Hook members as at 89 nest in openings in the structure when the closed door is lowered. The lower doors 64 further include stiffener struts as at 87 and lower structural extensions 88 to which is fixed a rear bumper member, which may be a continuous structural channel shown at 90.

As can be seen in the figures, the operating clearance required between the doors 62, 64 mandates a minimum vertical gap between the doors. In this embodiment, the lower door is of a reduced height insufficient to accomplish full closure of the lower compartment 18, a gap existing in the upper portion thereof. The gap, of course, allows full opening of the lower door 64 with the upper door 62 in the fully closed and latched position as shown. in FIG. 5. Full closure of the lower compartment is accomplished by the addition of the further hinged panel member or auxiliary closure device 66 which is suspended at the top of the lower compartment in a manner which enables it to freely swing vertically. As can be seen in the figures, and particularly in FIG. 2, the lower portion 92 of the auxiliary closure device or panel 66 is captured behind the upper portion of door 64 when it is in the closed position, thereby effecting closure of the remainder or upper portion of the lower compartment of the refuse body. As shown best in FIG. 4, the auxiliary closure member 66 is free to swing open with the door 64 once released by the raising of door 64. This allows full opening of the lower compartment for discharge. The door 64 is further operated by a fluid cylinder 94 with rod 96 which raises and swings open the door in the same manner as cylinder 76 operates door 62. As can be seen in the diagram of FIG. 5, doors can be in any position at any time without interfering with each other. The convex nature of the shape of the doors 62 and 64 better enables them to operate as pressure vessel ends so that material can be compacted against them and yet allows them to have their maximum protrusion located off center so that they do not interfere with each other.

It can thus be seen from the above descriptions that the tailgate system of the present invention allows and full and independent operation of the plurality of discharge doors to accommodate maximum flexibility in a rear-discharge multi-compartment collecting container.

It will further be appreciated that by hinging the lower door at a relatively low point, the center of gravity as raised a minimal amount when both doors are opened. It will further be recognized that the truck body used may be one which raises and dumps trash to aid material discharge although that model is not illustrated. That, of course, would not alter the nature of the tailgate system.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A tailgate system for a multi-compartment rear-discharging collection body to be mounted on a vehicle chassis and having a forward end and a rearward end and having material receiving and storage volumes, the multi-compartment collection body further including a generally horizontal intermediate divider wall for separating the storage volumes into upper and lower storage compartments, the rearward end of each compartment having a discharge opening for the discharge of material contained therein, the tailgate system comprising:

(a) an upper door associated with the upper compartment movably connected to an upper section of said collection body and operable for translating between a closed material retaining position and an open material ejection position;

(b) a lower door associated with said lower compartment spaced vertically from said upper door and movably connected to a mid portion of said collection body, said lower door operable for translating between a closed material retaining position and an open material ejection position, wherein said lower door has a height less than that of said discharge opening and is spaced from said upper opening in said lower compartment defining a gap therebetween;

(c) an auxiliary closure device normally closing the upper portion of said lower compartment with said lower door and operable between a closed material retaining position and an open material releasing position;

(d) an upper operating mechanism for opening and closing said upper door; and (e) a lower operating mechanism for opening and closing said lower door.

2. A tailgate system as in claim 1 wherein said auxiliary closure device is a top-hinged plate retained by an upper portion of said lower door.

3. A tailgate system as in claim 1 wherein each said upper door and said lower door are mounted from hinges that include vertically displacing pivots such that the associated upper or lower operating mechanism causes the door to be lifted prior to swinging open and lowered after closing.

4. A tailgate system as in claim 1 further comprising latching devices for automatically latching and unlatching said upper door and said lower door when said doors are closed and opened, respectively.

5. A tailgate system as in claim 3 further comprising latching devices for automatically latching and unlatching said upper door and said lower door when said doors are closed and opened, respectively.

6. A tailgate system as in claim 5 wherein said upper and said lower doors are latched and unlatched by the vertical displacement thereof and wherein said latching devices include hook and latch arrangements.

7. A tailgate system as in claim 1 wherein both said upper and said lower lifting mechanisms include a pair of oppositely disposed fluid cylinders.

8. A tailgate system as in claim 6 wherein both said upper and said lower lifting mechanisms include a pair of oppositely disposed fluid cylinders.

9. A tailgate system as in claim 1 wherein said auxiliary closure device opens and closes with the operation of said lower door.

10. A tailgate system as in claim 8 wherein said auxiliary closure device opens and closes with the operation of said lower door.

11. A tailgate system as in claim 1 wherein said gap between said upper door and said lower door is sufficient to enable full operation of said lower door regardless of the position of said upper door.

12. A tailgate system as in claim 1 wherein said gap between said upper door and said lower door is sufficient to enable full operation of said upper door regardless of the position of said lower door.

13. A tailgate system as in claim 1 wherein said doors are asymmetric bottom biased convex shapes.

14. A refuse collection vehicle including the tailgate system of claim 1.

* * * * *